March 20, 1962 S. POLESCHUK 3,025,959
EXTRUSION PRESS
Filed Nov. 2, 1959 5 Sheets-Sheet 1
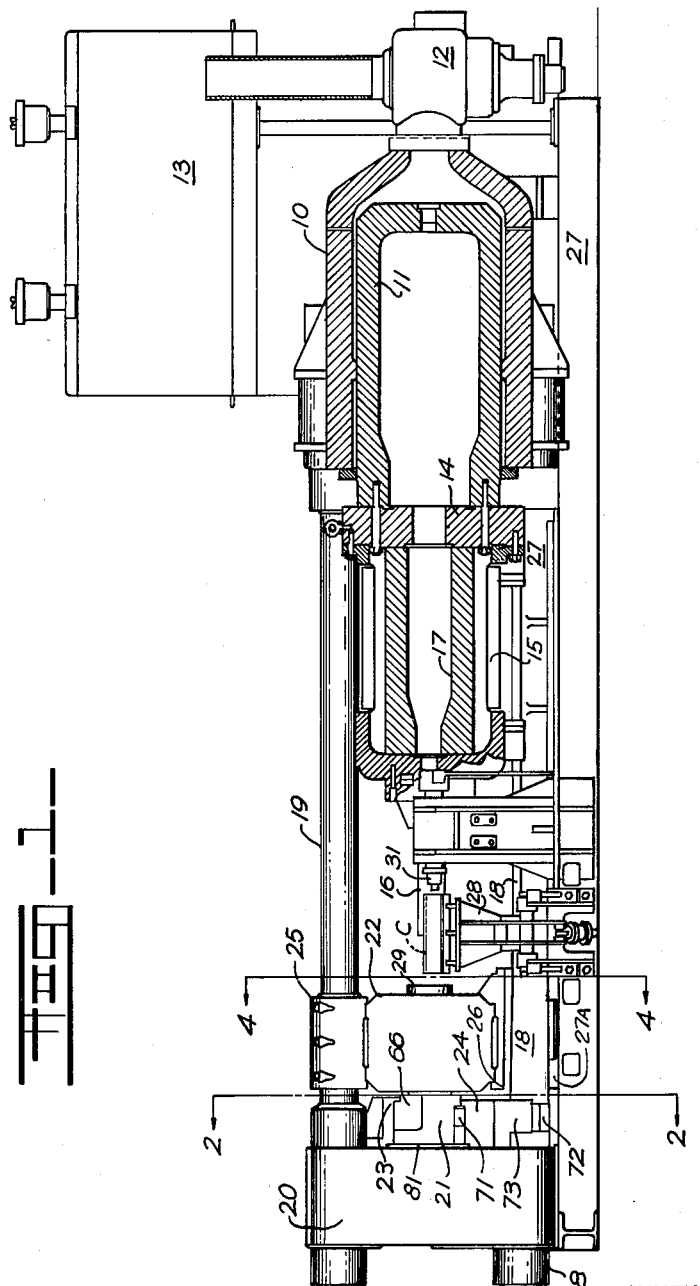
INVENTOR.
Stephen Poleschuk
BY
W. B. Harpman
ATTORNEY.

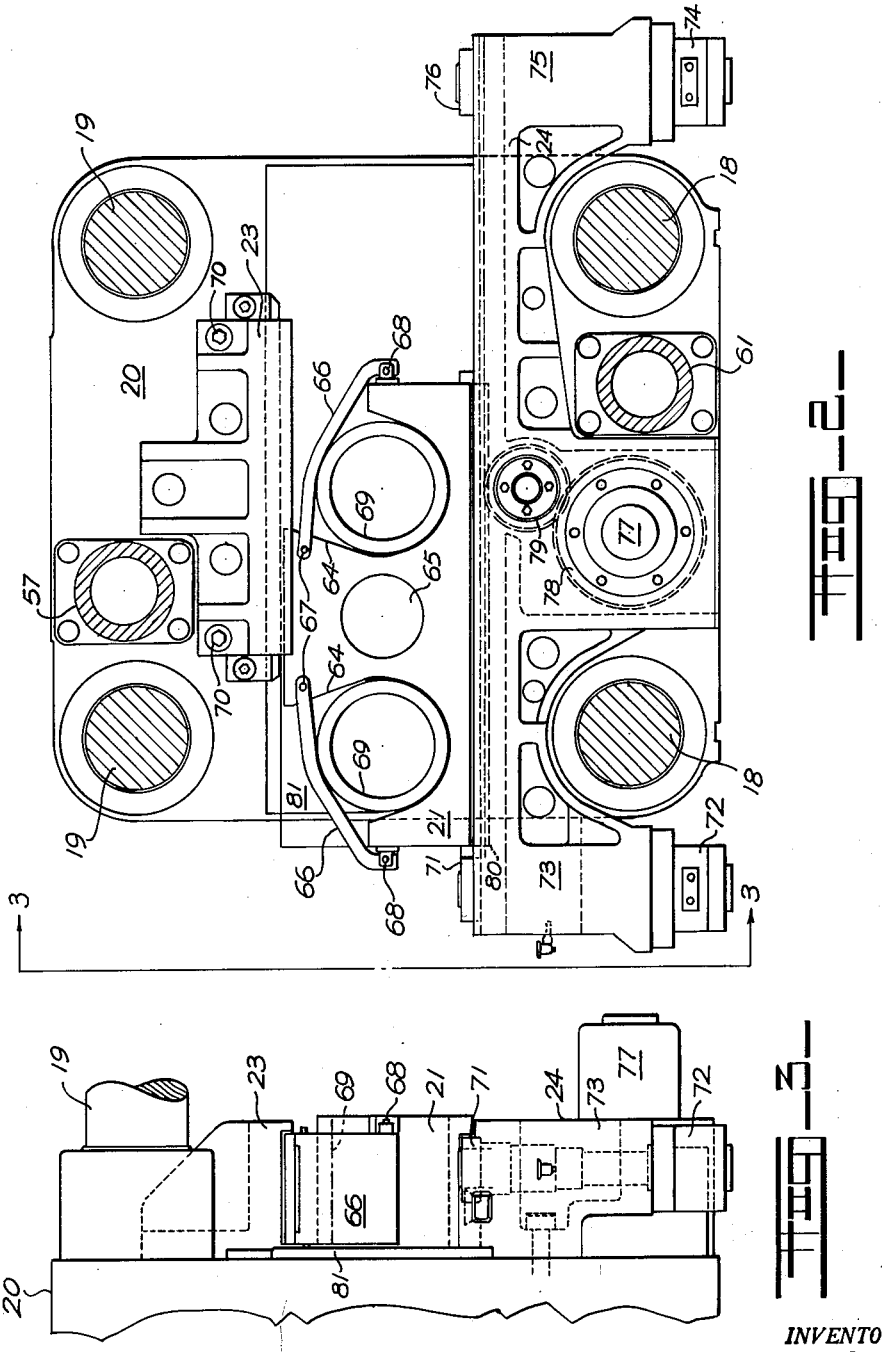

INVENTOR.
Stephen Poleschuk
BY
ATTORNEY.

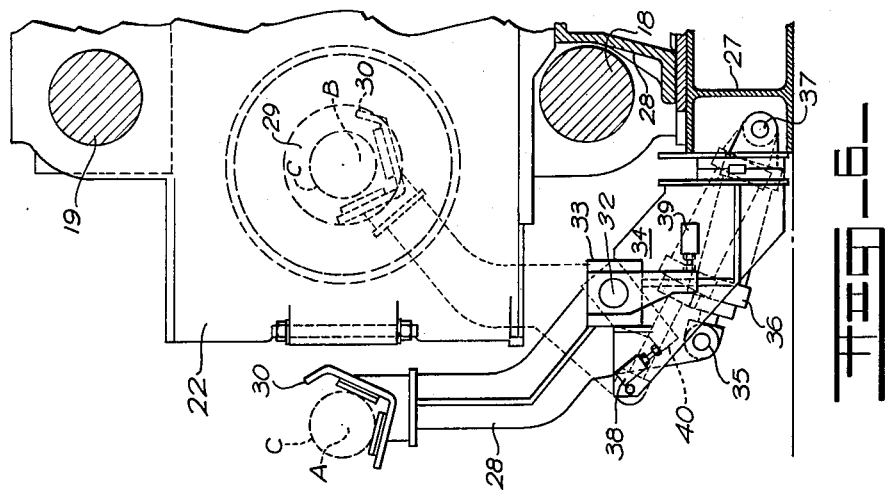
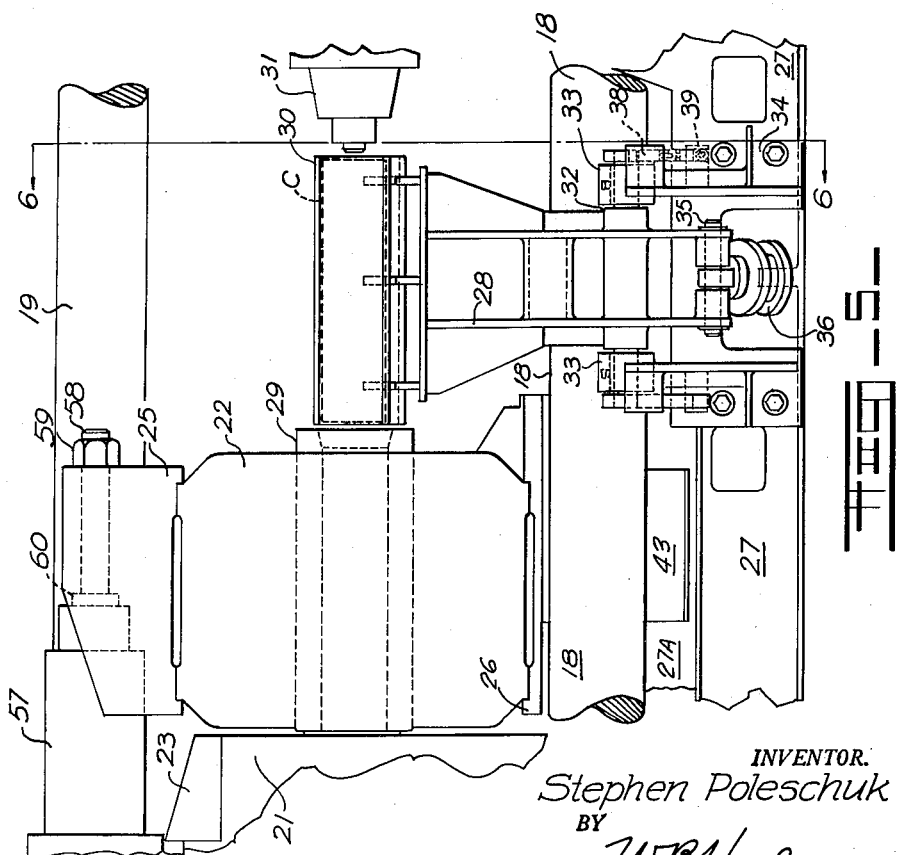

March 20, 1962

S. POLESCHUK 3,025,959

EXTRUSION PRESS

Filed Nov. 2, 1959

INVENTOR.
Stephen Poleschuk
BY
W. B. Harpman
ATTORNEY.

United States Patent Office 3,025,959
Patented Mar. 20, 1962

3,025,959
EXTRUSION PRESS
Stephen Poleschuk, 355 Deer Trail, Canfield, Ohio
Filed Nov. 2, 1959, Ser. No. 850,205
5 Claims. (Cl. 207—2)

The invention relates to an extrusion press and more particularly to an improved press making possible increased production.

The principal object of the invention is the provision of an extrusion press that can extrude practically continuously and thereby eliminate the lost production time inherent in extrusion presses heretofore known in the art and which time has heretofore been lost in loading the billet, cooling the die, shearing the butt of an extruded metal and ejecting the same with the dummy block, etc.

A still further object of the invention is the provision of an extrusion press which utilizes transversely movable dual die carrying means and transversely movable dual container carrying means so that alternate billets are positioned in alternate containers and extruded through alternate dies.

A further object of the invention is the provision of an extrusion press in which dual tooling assemblies are alternately movable out of extruding position to a cooling position and wherein dual billet containers are alternately movable out of extruding position into loading position.

A still further object of the invention is the provision of an extrusion press wherein butt shearing is accomplished by moving the tooling a short distance relative to the container thus making a butt shear unnecessary.

A still further object of the invention is the provision of an extrusion press in which the butt and the dummy block are left in the container following the extrusion of a billet in the press for ejection from the container during a subsequent loading operation wherein the dummy blocks are alternately ejected to each side of the extrusion press.

A still further object of the invention is the provision of an extrusion press wherein the temperature of the tooling is held at a desirable operational level by alternately cooling and using the tooling so as to avoid any tendency of the tooling to pick up the metal being extruded as occurs when the temperature of the tools approaches the draw temperature.

A still further object of the invention is the provision of an extrusion press wherein the temperature of the tooling and the temperature of the billet containers remains at a desirable operational level through the spaced alternate use of the different tooling and containers while permitting substantially continuous extrusion and hence a rapid rate of production.

The extrusion press disclosed herein is designed to increase production by utilizing the time lost in extrusion presses heretofore known in loading the billet, cooling the die, shearing the butt of the extruded metal and ejecting the same with the dummy block through the use of the ram of the extrusion press. In the presently disclosed extrusion press double tooling and double containers for the billets to be extruded are positioned in respective side by side arrangement so that one set of tooling can be aligned with the ram and one of the containers can be aligned with the ram while the other set of tooling and the other container are positioned at the respective opposite sides of the press and may, therefore, be cooled in the case of the tooling and reloaded in the case of the container while production continues in the press. It is well known in the art that the extrusion of metals requires extremely careful and critical observation of the temperatures generated in the tooling and the containers of the billets being extruded for the reasons that as the temperature of the tooling increases the tendency to pick up the material being extruded is increased and concurrently the rate of wear on the tooling increases sharply. Thus increased temperatures in the tooling as have heretofore commonly occurred affect production of a desirable extruded shape and clearly shorten the life of the extrusion dies. In the present invention the tooling is used to extrude a single billet and then moved sidewardly away from extruding position where the tooling is cooled by suitable means. During the cooling of the particular tooling referred to the alternate set of tooling is in extruding position and production of the extrusion press continues. Following extrusion of a billet, the container is moved sidewardly from extruding position where the butt and dummy block are ejected and a new billet loaded. Simultaneously, the alternate container is moved into extruding position and production on the extrusion press continues. It will thus be observed that by providing dual tooling supporting means and the dual containers both of which are movable transversely of the press and specifically with respect to the alignment of the ram thereof, substantially continuous production may be safely realized.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a longitudinal vertical section of an extrusion press incorporating dual tooling and dual containers.

FIGURE 2 is an enlarged vertical section on line 2—2 of FIGURE 1.

FIGURE 3 is a vertical end elevation on line 3—3 of FIGURE 2.

FIGURE 5 is an enlarged side elevation detail of a portion of the press shown in FIGURE 1.

FIGURE 6 is a vertical section on line 6—6 of FIGURE 5.

Figure 4:
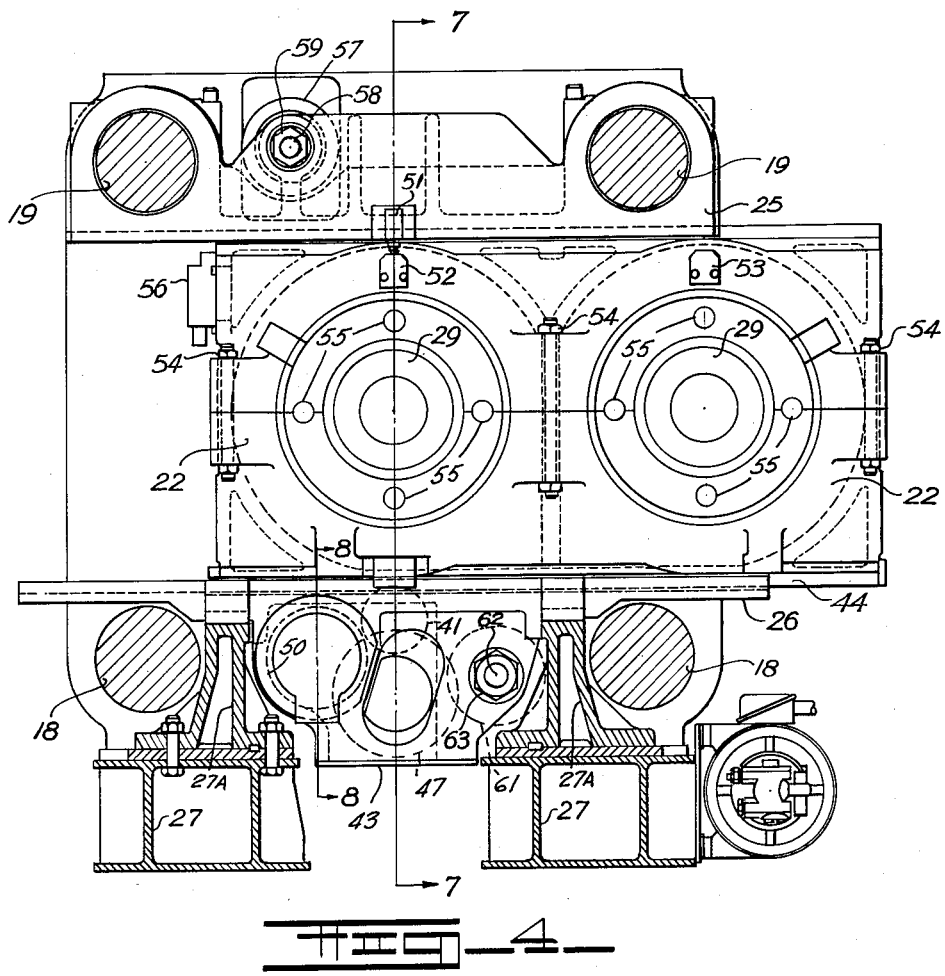
FIGURE 4 is an enlarged vertical section on line 4—4 of FIGURE 1.

By referring to the drawings and FIGURE 1 in particular it will be seen that an extrusion press has been disclosed which includes a main cylinder 10 having a ram 11 reciprocably positioned therein, the main cylinder 10 communicating with a hydraulic actuating system including a surge valve 12 and reservoir 13 as known in the art. The ram 11 carries a crosshead 14 which in turn supports a piercer housing 15, the forward end of which in turn carries a stem 16. The piercer housing 15 is designed to incorporate, if desired, a piercer arrangement or mandrel manipulator which, as will be understood by those skilled in the art, would be reciprocably mounted within the cylinder 17 positioned in the piercer housing 15 and wherein the mandrel if used would extend forwardly through a hollow stem otherwise comparable with the stem 16 as disclosed herein. Such an arrangement permits the inclusion of a manipulated piercer mandrel.

The extrusion press as shown in FIGURE 1 includes two pairs of tie-rods 18 and 19. Each of the tie-rods of the pair 18 are horizontally spaced with respect to one another and each of the tie-rods of the pair 19 are horizontally spaced with respect to one another. Both pairs of tie-rods are secured at their right hand ends, as shown in FIGURE 1, to the main cylinder 10 and at their left hand ends to an apertured platen 20. Between the platen 20 and the stem 16 a transversely positioned die slide 21 (see also FIGURES 2 and 3) is located beside a transversely movable dual container 22. The die slide 21 is positioned between upper and lower die slide guides 23 and 24, which are secured to the platen 20. The dual container 22 is positioned between upper and lower container guides 25 and 26 (see FIGURES 4, 5, 7 and 8) which guides are movably supported on the tie-rods 19 and on a base frame 27 of the extrusion press, respectively. By referring to FIGURE 4 of the drawings it will be seen that the dual container guide 26 is positioned above the base frame 27 of the press by brackets 27A so that an area below the guide 26 and above the base frame 27 is available for the installation of actuating means for moving the dual containers 22 transversely.

By again referring to FIGURE 1 of the drawings it will be seen that billet loaders each of which includes a movable arm 28 are positioned between the dual container 22 and the piercer housing 15, one on either side of the stem 16. One of the billet loaders is best illustrated in FIGURES 5 and 6 of the drawings and by referring thereto it will be observed that it is movable from a position A beside the press to a position B, as shown in dotted lines in longitudinal alignment with one of the bores of the dual container 22. The dual container 22 has two bores therethrough spaced transversely with respect to one another and each of which is provided with a liner 29.

A billet C positioned on the loading trough 30 of one of the arms 28 of the billet loaders may, therefore, be moved into one of the liners 29 of the dual container 22 by either one of a pair of loader piston and cylinders 31, positioned between the loading troughs 30 and the cylinder 10, and alongside the stem 16, as shown in FIGURES 1 and 5 of the drawings where the loader cylinders align with the out position of the dual containers 22, the loader piston and cylinders 31 act to push the billets C from the loader troughs 30 into the liners 29 one at a time so that the billet C is positioned in one of the bores of the dual container 22. Still referring to FIGURES 5 and 6 of the drawings it will be seen that the arm 28 of each billet loader is pivoted on a transverse shaft 32 which in turn is journalled in bearing blocks 33, carried on brackets 34 which are in turn secured to the base frame 27. The arm 28 extends below the shaft 32 and its lowermost end, which is bifurcated, journals a shaft 35 which in turn is pivotally secured to one end of an actuating piston and cylinder 36. The other end of the actuating cylinder 36 is pivoted to the base frame 27 by a pivot 37. Adjustable stop members 38 and 39 are positioned on one of the brackets 34 and arranged to engage an offset end portion 40 formed on the loader arm 28. Thus the correct positioning of the loader trough 30 may be determined and insured by the engagement of the stop members 38 and 39 so that the loader arm 28 will always position the loader trough 30, in proper position for loading as in position A, as seen in FIGURE 6, as well as in proper position for delivering a billet, as seen in position B in FIGURE 6.

Figure 7:
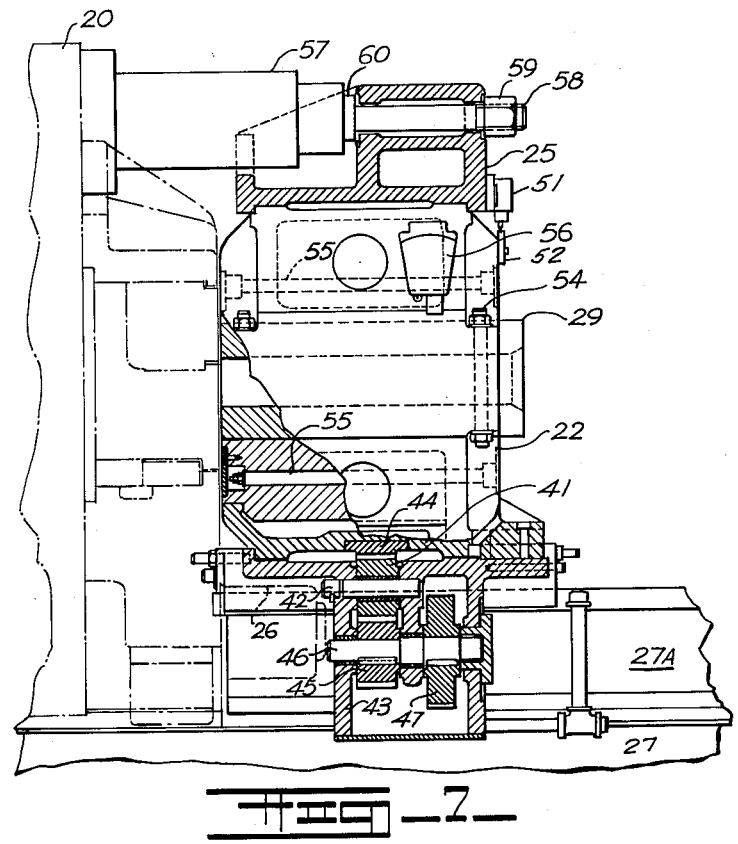
FIGURE 7 is a vertical section on line 7—7 of FIGURE 4.
Figure 8:
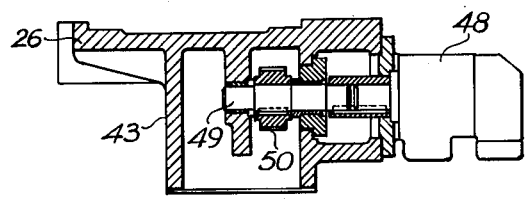
FIGURE 8 is a sectional detail on line 8—8 of FIGURE 4.

The dual container 22 is mounted for transverse movement on the upper and lower container guides 25 and 26 heretofore referred to and by referring to FIGURES 1, 4, 7 and 8 it will be observed that means is provided for moving the dual containers relative to said guides. In FIGURES 4 and 7 in particular it will be observed that the container guide 26 on which the dual container 22 rests is slotted intermediate its ends and a gear 41 is positioned partially in said slot, being journalled on a shaft 42 which in turn is positioned transversely of a gear box 43 which forms a lower portion of the container guide 26. The gear 41 is positioned so that a portion of it extends upwardly through the slot in the container guide 26 and engages a rack 44 formed longitudinally on the bottom of the dual container 22. The gear 41 is engaged by a secondary gear 45 which is journalled on a shaft 46 also positioned transversely of the gear box 43 and in spaced parallel relation to the shaft 42. The gear 45 is keyed to the shaft 46 and a third gear 47 is also keyed to said shaft 46. A motor 48, as seen in FIGURE 8, is coupled to a drive shaft 49 having a spur gear 50 thereon and mounted in the gear box 43 forwardly of the section shown in FIGURE 7 so that the spur gear 50 engages the gear 47 on the shaft 46.

It will thus be seen that motion originating in the motor 48 which is hydraulic, as known in the art, is conveyed to the gear 41 engaged on the rack 44 and the dual container 22 moved thereby. A limit switch 51 mounted on the upper container guide 25 is arranged to shut off the motor 48 and it in turn is operated by cams 52 and 53 positioned on the dual container 22. Thus the dual container 22 may be moved to the position shown in FIGURE 4 where the left hand bore therein is in axial alignment with the stem 16 of the ram 11 of the extrusion press and the dual container may be alternately moved from the position shown in FIGURE 4 to the left so that the right hand bore therein can be alternately brought into axial alignment with the stem 16.

It will thus be seen that a billet loaded into the liner 29 defining the left hand bore of the dual container 22, as seen in FIGURE 4 may be moved toward the extrusion dies positioned in the die slide 21 by the ram 11 and stem 16 and when extruded, the butt sheared by a subsequently described action of the die slide mechanism whereupon the dual container 22 may be moved to the left bringing a new billet, previously loaded into the liner 29 of the right hand bore thereof, into position for extrusion. Simultaneously the die slide 21 will have moved transversely as hereinafter described to position an alternate die in axial alignment with the new billet and the stem 16 of the ram 11.

Still referring to FIGURES 4 and 7 it will be seen that the dual container 22 is formed of oppositely disposed upper and lower sections which are secured to one another by a plurality of fasteners 54. It will be observed that the respective upper and lower portions of the dual container 22 are provided with a plurality or resistance heating units 55 which are energized from a suitable power source, not shown, and controlled by an indicating temperature control device 56. As will be understood by those skilled in the art, the heating units in the dual container maintain the billets in the liners 29 thereof at a suitable working temperature.

Still referring to FIGURES 4 and 7 it will be observed that the upper container guide 25 is mounted on the tie-rods 19 and movable relative thereto and positioned with respect to the platen 20 by a container shift piston and cylinder assembly 57, the piston rod 58 of which passes through a portion of the container guide 25 and is secured thereto by means of a threaded nut 59 engaged on the piston rod 58 in oppositely disposed relation to a shoulder 60 thereon. The lower container guide 26 is also movable longitudinally of the press in the same manner as the upper container guide 25 and a container shift piston and cylinder assembly 61 (see FIGURE 2) is provided for imparting movement thereto simultaneously with the operation of the container shift piston and cylinder 57 heretofore referred to. The piston rod 62 of the secondary container shift cylinder 61 may be seen in FIGURE 4 as having a nut 63 engaged thereon so as to hold the dual container guide 26 in operative connection thereto. When hollow extrusions are produced utilizing a spider type die the container shift cylinders 57 and 61 move the dual container 22 away from the die position so as to tear the metal and permit the subsequent sideward shift of the dual container 22. It will thus be observed that the dual container 22, in addition to being capable of being moved transversely of the extrusion press as heretofore described so that alternate billets in alternate liners 29 in the dual container 22 may be extruded, is capable of being moved longitudinally of the press by the container shift piston and cylinder assemblies 57 and 61 respectively so that metal positioned between the dies and the containers may be torn free to permit the cycling of the press. In addition such operation may be useful in pushing the butt and dummy block out of the liner 29 as the same can be moved relative to the stem 16 and the ram 11.

In the extrusion press disclosed herein the extrusion dies are removably positioned in the die slide 21 which is best illustrated in FIGURES 1, 2 and 3 of the drawings and by referring thereto it will be seen that the die slide 21 is positioned between the platen 20 and the dual container 22. The die slide 21 comprises a body member having a pair of recesses 64 therein in which the extrusion dies, not shown, may be positioned. Intermediate the recesses 64 a sticker opening 65 is formed. A pair of clamps 66 pivoted to the die slide 21 by pivots 67 and attachable to the opposite ends of the die slide 21 by suitable latches 68 are provided for holding extrusion dies in the respective recesses 64. It will be observed that in FIGURE 2 of the drawings the recesses 64 are shown with annular members 69 therein in the right one of which a first die may be positioned. In such position the die in the annular member 69 is in axial alignment with the left hand bore defined by the liner 29 in the dual container 22 as seen in FIGURE 4 of the drawings and both of these areas are in axial alignment with the stem 16 of the ram 11.

It will be seen that the die slide 21 is mounted for transverse movement relative to the press by means of the upper die slide guide 23 and the lower die slide guide 24. The upper die slide guide 23 is secured to the platen 20 by means of a plurality of fasteners 70 and the lower die slide guide 24 is secured to the platen 20 so that the die slide 21 may be moved transversely of the extrusion press in the die slide guides 23 and 24. In FIGURE 2 of the drawings the die slide guide is shown in position adjacent the left-hand end of the lower die slide guide 24 and immediately adjacent an eccentric 71 on a torque motor 72 which is mounted in an end extension 73 of the lower die slide guide 24. A similar torque motor 74 is mounted in the opposite end extension 75 of the die slide guide 24 and drives an eccentric 76 which is positioned in a location to engage the opposite end of the die slide guide 21 when the same is moved to the right as seen in FIGURE 2. Additional means for moving the die slide 21 is provided and comprises a motor 77 driving a gear 78 which in turn is engaged with a spur gear 79 which is positioned so that the upper portion thereof is in a slot in the lower die slide guide 24 and engaged with a rack 80 formed on the bottom of the die slide 21. Thus motion of the motor 77, which is preferably hydraulic, will move the die slide 21 transversely of the press so as to bring the die mounting recesses 64 therein into alternate registry with the center line of the press and thereby in axial alignment with the stem 16 of the ram 11 of the extrusion press.

By still referring to FIGURES 2 and 3 of the drawings it will be seen that a pressure plate 81 is positioned between the die slide 21 and the platen 20 and has a central opening therein on the center line thereof which registers with a central opening in the platen 20. By referring now to FIGURE 1 of the drawings it will be seen that the platen 20 and the pressure plate 81 define means for supporting the extrusion dies (the tooling) during an extruding operation and that the openings therein permit metal extruded through the extrusion dies to emerge from the left end of the extrusion press.

Operation

In operation the improved extrusion press disclosed herein extrudes practically continuously by reason of the fact that duplicate extrusion dies are positioned one in each of the recesses 64 in the die slide 21 and the die slide is initially positioned, for example, as shown in FIGURE 2 of the drawings with the die in the right hand recess 64 therein on the axial center line of the press. A billet previously loaded by the billet loader into the left hand bore of the dual container 22 as seen in FIGURE 4 of the drawings is also on the axial center line of the press and thereby in alignment with the respective positioned die assembly in the die slide 21 as just described and the stem 16 of the ram 11. The ram 11 is then actuated by the hydraulic system 12 as will be understood by those skilled in the art and the stem 16 moves toward the platen 20 extruding the metal of the billet as will also be understood by those skilled in the art. Simultaneously with this extruding operation the die in the left hand recess 64 of the die slide 21, which is in non-extruding position and readily accessible at the side of the press, is being cooled and sprayed while the right hand bore in the dual container 22 is being loaded with a new billet from the other side of the press. When the first billet has been extruded the stem 16 is retracted by reverse operation of the ram 11 and the torque motor 72 is energized to move the eccentric 71 and hence impart sideward motion of approximately ¾ of an inch to the die slide 21 which will shear the billet butt whereupon the motor 77 is energized and through the gears 78 and 79 continues the movement of the die slide 21 to the right as shown in FIGURE 2 to bring the die in the left hand recess 64, as seen in FIGURE 2, into axial alignment with the stem 16 of the ram 11 and to bring the first die sidewardly to the right side of the press where it may be cooled and sprayed. As this occurs the dual container 22 is shifted from right to left by the motor 48 as heretofore described in connection with FIGURES 4, 7 and 8 of the drawings and a new billet is thereby positioned in axial alignment with the stem 16 of the ram 11 which is then actuated to start the second extruding cycle.

Those skilled in the art will understand that the shifting of the die slide 21 and the dual container 22 are preferably achieved simultaneously and that the extrusions are pulled out at the proper time. The billet butt and the dummy block in the dual container are ejected and the container reloaded for the subsequent extruding cycle. It will thus be seen that by providing alternate sets of tooling (dies) and alternate containers for alternate billets to be extruded, the extrusion press disclosed herein meets the several objects of the invention by its ability to extrude practically continuously and by avoiding the time heretofore lost in cooling the dies and loading the containers, etc., in extrusion presses heretofore known in the art. When the extrusion press is used to form hollow extrusions it utilizes a spider type die, the only variation in the operation cycle just described is in the non-use of the torque motors 72 and 74 and the eccentrics 71 and 76 and the utilization of the stripper cylinders 57 and 61 to move the dual container 22 toward the ram 11 so as to tear the metal.

It will thus be seen that the extrusion press disclosed herein meets the several objects of the invention and having thus described my invention, what I claim is:

1. In an extrusion press having a platen, a main cylinder and ram and longitudinally extending tie rods positioned in radially spaced relation to said ram, a pair of extrusion dies, a pair of vertically spaced guide members positioned transversely of said extrusion press adjacent said platen and a die mounting slide positioned in said guide members for rectilinear movement, clamps on said slide for securing said extrusion dies in openings therein in horizontally spaced relation to one another, eccentrics positioned one at each end of one of said guides, torque motors driving said eccentrics and acting to impart movement to said slide when engaged thereagainst so as to shear metal being extruded through one of said dies, a first motor in said extrusion press, gears driven by said motor, a rack on said slide engaged on said gears whereby said slide may be moved rectilinearly of said press so that either one of said pair of extrusion dies may be aligned with said ram, vertically spaced container guides positioned transversely in said extrusion press, and a container having horizontally spaced dual bores therein mounted in said container guides for rectilinear movement, a secondary motor and gears in said extrusion press, a rack on said container engaged on said gears whereby said container may be moved rectilinearly of said press, said container arranged so that either one of said bores in said container may be aligned with said ram, and means for moving said container guides longitudinally of said extrusion press.

2. In an extrusion press having a platen, a container for billets to be extruded and a ram for moving said billets, a structure positioned intermediate said platen and said container and having a transverse passageway therethrough, said structure having horizontal channels formed therein and located adjacent the upper and lower parts of said passageway, a two place horizontally movable die slide disposed in said passageway and engaging said horizontal channels in said structure, two sets of dies in said two place die slide in abutting relation to said container and said platen, and means for moving said die slide and dies in said passageway into alignment with said ram, and eccentrics at either end of said structure, torque motors for revolving said eccentrics for moving said die slide and said dies therein to shear metal being extruded therethrough, a secondary structure positioned intermediate said first-mentioned structure and said ram and having a secondary transverse passageway therethrough, secondary horizontal channels formed adjacent the upper and lower parts of said secondary structure, said container being movably positioned in said secondary transverse passageway and engaging said secondary horizontal channels, said container having two bores therein, liners positioned one in each of said bores in abutting relation to said die slide for receiving said billets, and means for moving said container along said secondary passageway whereby said bores therein move into individual alignment with said ram and means for moving said secondary structure longitudinally of said extrusion press.

3. In an extrusion press including a platen having an opening therethrough, a die slide movable along a rectilinear path across said opening to alternate operative positions and inoperative positions and having spaced passages therethrough for individual registry with said opening in said operative positions of said die slide, dies co-operating with said slide and adapted to register with said passages and opening for extruding metal therethrough, and cutting means carried by said die slide for severing extruded metal from residue of metal in said dies during movement of said slide, the combination comprising a pair of eccentrics positioned one at either end of said rectilinear path, torque motors for rotating said eccentrics, said eccentrics having a contour resulting in a motion sufficient for moving said slide during the cutting of extruded metal and a third motor for moving said die slide along said rectilinear path to its operative and inoperative positions.

4. The extrusion press set forth in claim 3 and wherein said press has a ram and a stem thereon in alignment with said opening, a dual billet container movable along a rectilinear path adjacent to and parallel with said die slide to alternate operative positions and inoperative positions and having a pair of spaced liners therein for receiving billets to be extruded for individual registry with said opening in said operative positions and means for moving said dual billet container toward and away from said die slide.

5. In an extrusion press having an apertured platen, the combination of a die slide movable along a rectilinear path across said aperture in said platen, said die slide having spaced openings therein, a die positioned in each of said openings for individual registry with said aperture in said platen when said die slide is moved to alternate positions on said path, cutting means carried by said die slide for cutting extruded metal from residue metal in said die during movement of said slide and a pair of eccentrics positioned one at either side of said platen, torque motors individually driving said eccentrics, said eccentrics arranged to engage the respective ends of said die slide for imparting limited cutting motion thereto and separate means for moving said die slide transversely of said platen to alternate positions adjacent said eccentrics.

References Cited in the file of this patent
UNITED STATES PATENTS

| 1,317,238 | Summey | Sept. 30, 1919 |
| 1,574,792 | Clark | Mar. 2, 1926 |
| 2,738,063 | Billen | Mar. 13, 1956 |
| 2,858,017 | Kent et al. | Oct. 28, 1958 |
| 2,880,867 | Keck | Apr. 7, 1959 |
| 2,900,090 | Sack | Aug. 18, 1959 |

FOREIGN PATENTS

| 542,045 | Germany | Jan. 19, 1932 |
| 804,220 | Great Britain | Nov. 12, 1958 |
| 1,163,770 | France | Apr. 28, 1958 |